(12) United States Patent
Rosenberg

(10) Patent No.: US 9,940,006 B2
(45) Date of Patent: Apr. 10, 2018

(54) INTUITIVE INTERFACES FOR REAL-TIME COLLABORATIVE INTELLIGENCE

(71) Applicant: Unanimous A.I. LLC, Pismo Beach, CA (US)

(72) Inventor: Louis B. Rosenberg, San Luis Obispo, CA (US)

(73) Assignee: UNANIMOUS A. I., INC., San Francisco, CA (US)

( * ) Notice: Subject to any disclaimer, the term of this patent is extended or adjusted under 35 U.S.C. 154(b) by 292 days.

(21) Appl. No.: 14/738,768

(22) Filed: Jun. 12, 2015

(65) Prior Publication Data

US 2015/0331601 A1 Nov. 19, 2015
US 2016/0320956 A9 Nov. 3, 2016

Related U.S. Application Data

(63) Continuation-in-part of application No. 14/668,970, filed on Mar. 25, 2015, and a continuation-in-part of application No. 14/708,038, filed on May 8, 2015.

(Continued)

(51) Int. Cl.
| | |
|---|---|
| G06F 3/0484 | (2013.01) |
| E21B 47/12 | (2012.01) |
| E21B 47/18 | (2012.01) |
| G06Q 10/10 | (2012.01) |
| G06F 3/0488 | (2013.01) |

(Continued)

(52) U.S. Cl.
CPC ........ G06F 3/04847 (2013.01); E21B 47/122 (2013.01); E21B 47/18 (2013.01); G06F 3/04812 (2013.01); G06F 3/04842 (2013.01); G06F 3/04883 (2013.01); G06Q 10/101 (2013.01); H04L 67/14 (2013.01)

(58) Field of Classification Search
CPC .. G06Q 10/101; G06Q 10/103; H04L 65/403; H04L 12/1822; H04L 67/10; G06F 17/241; G06F 3/04817
See application file for complete search history.

(56) References Cited

U.S. PATENT DOCUMENTS

| | | | |
|---|---|---|---|
| 5,808,908 | A | 9/1998 | Ghahramani |
| 7,937,285 | B2 | 5/2011 | Goldberg |

(Continued)

FOREIGN PATENT DOCUMENTS

| | | |
|---|---|---|
| CA | 2414397 | 8/2003 |
| WO | 2014190351 | 11/2014 |

OTHER PUBLICATIONS

Beni; "From Swarm Intelligence to Swarm Robotics"; Swarm Robotics WS 2004, LNCS 3342; pp. 1-9; 2005.

(Continued)

*Primary Examiner* — Tadesse Hailu
(74) *Attorney, Agent, or Firm* — Fitch, Even, Tabin & Flannery LLP

(57) ABSTRACT

Systems and methods for user interfaces for use on a computing device of a real-time collaborative computing system. A collaborative application runs on the computing device and displays information and data regarding the collaboration system and also receives user input via the user interface. The display interface arrangement may vary based on a type of collaborative session. Graphical user interfaces include a user interface based on a magnetic force model.

3 Claims, 6 Drawing Sheets

Related U.S. Application Data

(60) Provisional application No. 62/012,403, filed on Jun. 15, 2004, provisional application No. 61/970,885, filed on Mar. 26, 2014, provisional application No. 61/991,505, filed on May 10, 2014.

(51) Int. Cl.
  *G06F 3/0481* (2013.01)
  *H04L 29/08* (2006.01)

(56) References Cited

U.S. PATENT DOCUMENTS

| | | | |
|---|---|---|---|
| 2002/0171690 A1* | 11/2002 | Fox | G06F 3/04812 715/860 |
| 2003/0065604 A1 | 4/2003 | Gatto | |
| 2003/0079218 A1 | 4/2003 | Goldberg | |
| 2005/0168489 A1 | 8/2005 | Ausbeck | |
| 2006/0200401 A1 | 9/2006 | Lisani | |
| 2006/0250357 A1* | 11/2006 | Safai | G06F 3/038 345/157 |
| 2007/0097150 A1 | 5/2007 | Ivashin | |
| 2007/0099162 A1 | 5/2007 | Sekhar | |
| 2007/0124503 A1* | 5/2007 | Ramos | G06F 3/017 709/248 |
| 2009/0037355 A1 | 2/2009 | Brave | |
| 2009/0063991 A1* | 3/2009 | Baron | H04L 12/1822 715/751 |
| 2009/0325533 A1 | 12/2009 | Lele | |
| 2010/0169144 A1 | 7/2010 | Estill | |
| 2010/0299616 A1 | 11/2010 | Chen | |
| 2011/0087687 A1* | 4/2011 | Immaneni | G06F 17/30106 707/769 |
| 2011/0119048 A1 | 5/2011 | Shaw | |
| 2012/0109883 A1 | 5/2012 | Iordanov | |
| 2012/0290950 A1 | 11/2012 | Rapaport | |
| 2013/0041720 A1* | 2/2013 | Spires | G06Q 30/00 705/7.32 |
| 2013/0231595 A1 | 9/2013 | Zoss | |
| 2013/0298690 A1 | 11/2013 | Bond | |
| 2013/0311904 A1 | 11/2013 | Tien | |
| 2013/0339445 A1 | 12/2013 | Perincherry | |
| 2014/0108915 A1* | 4/2014 | Lu | G06F 17/2247 715/234 |
| 2014/0162241 A1 | 6/2014 | Morgia | |
| 2014/0249889 A1 | 9/2014 | Park | |
| 2014/0258970 A1 | 9/2014 | Brown | |
| 2014/0279625 A1 | 9/2014 | Carter | |
| 2014/0379439 A1 | 12/2014 | Sekhar | |
| 2015/0170050 A1* | 6/2015 | Price | G06N 99/005 706/13 |
| 2015/0331601 A1 | 11/2015 | Rosenberg | |

OTHER PUBLICATIONS

Rosenberg; U.S. Appl. No. 15/199,990, filed Jul. 1, 2016.
Rosenberg; U.S. Appl. No. 15/241,340, filed Aug. 19, 2016.
Salminen; "Collective Intelligence in Humans: A Literature Review"; Lappeenranta University of Technology, Lahti School of Innovation; 1Proceedings; 2012; 8 pages.
Unanimous A. I.; "What is Swarm Intelligence"; 2015; http://unu.ai/swarm-intelligence/; downloaded Oct. 6, 2016; 3 pages.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
PCT; International Search Report and Written Opinion of the International Searching Authority for PCT/US2016/040600 dated Nov. 29, 2016.
USPTO; Non-Final Office Action for U.S. Appl. No. 16/668,970 dated Aug. 15, 2017.
Yeung et al.; "Metacognition in human decision-making: confidence and error monitoring"; Philosophical Transactions of the Royal Society B; 2012; pp. 1310-1321.
PCT; International Search Report and Written Opinion of the International Searching Authority for PCT/US2015/56394 dated Feb. 4, 2016.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
USPTO; Non-Final Office Action for U.S. Appl. No. 15/047,522 dated Jan. 5, 2018.
PCT; International Search Report and Written Opinion of the International Searching Authority for PCT/US2017/040480 dated Oct. 23, 2017.
EP; Extended European Search Report for EP Application No. 15767909.3 mailed from the European Patent Office dated Sep. 4, 2017.
EP; Extended European Search Report for EP Application No. 15808982.1 mailed from the European Patent Office dated Nov. 28, 2017.

* cited by examiner

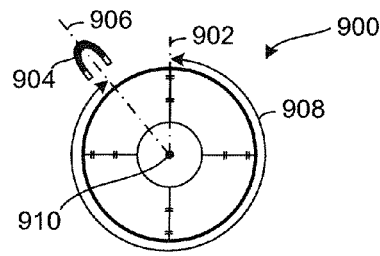
FIG. 9
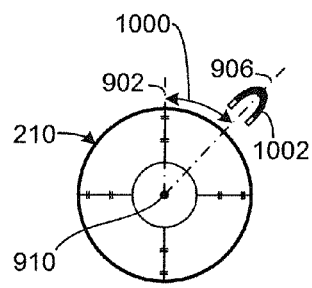 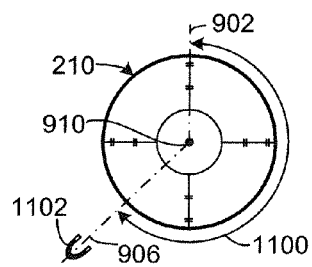 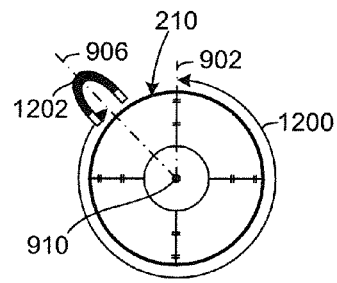
FIG. 10　　FIG. 11　　FIG. 12
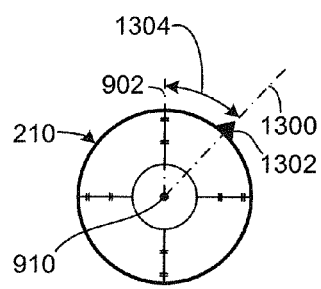 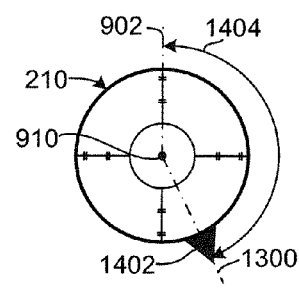 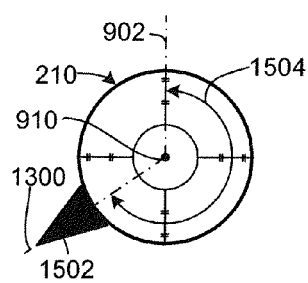
FIG. 13　　FIG. 14　　FIG. 15

INTUITIVE INTERFACES FOR REAL-TIME COLLABORATIVE INTELLIGENCE

This application claims the benefit of U.S. Provisional Application No. 62/012,403 entitled AN INTUITIVE INTERFACE FOR REAL-TIME COLLABORATIVE CONTROL, filed Jun. 15, 2014, which is incorporated in its entirety herein by reference.

This application is a continuation-in-part of U.S. application Ser. No. 14/668,970 entitled METHODS AND SYSTEMS FOR REAL-TIME CLOSED-LOOP COLLABORATIVE INTELLIGENCE, filed Mar. 25, 2015, which in turns claims the benefit of U.S. Provisional Application 61/970,885 entitled METHOD AND SYSTEM FOR ENABLING A GROUPWISE COLLABORATIVE CONSCIOUSNESS, filed Mar. 26, 2014, both of which are incorporated in their entirety herein by reference.

This application is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turns claims the benefit of U.S. Provisional Application 61/991,505 entitled METHOD AND SYSTEM FOR MULTI-TIER COLLABORATIVE INTELLIGENCE, filed May 10, 2014, both of which are incorporated in their entirety herein by reference.

BACKGROUND OF THE INVENTION

1. Field of the Invention

The present invention relates generally to systems and methods for group collaboration, and more specifically to systems and methods for closed-loop, dynamic group collaboration.

2. Discussion of the Related Art

Portable computing devices, such as cell phones, personal digital assistants, and portable media players have become popular personal devices due to their highly portable nature, their ability to provide accessibility to a large library of stored media files, their interconnectivity with existing computer networks, and their ability to pass information to other portable computing devices and/or to centralized servers through phone networks, wireless networks and/or through local spontaneous networks such as Bluetooth networks. Many of these devices also provide the ability to store and display media, such as songs, videos, podcasts, ebooks, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to have a real-time group-wise experience that evokes the group's collaborative intent and intelligence (Collaborative Consciousness). Hence, there is a substantial need to provide tools and methods by which groups of individuals, each having a portable computing device upon their person, to more easily contribute their personal will/intent to an emerging collaborative consciousness, allowing the group to collectively answer questions or otherwise express their group-wise will in real-time. Furthermore, there is a need to provide tools and methods that enable groups of users to be informed of the group-wise will that is emerging in real-time. The present invention, as described herein, addresses these and other deficiencies present in the art.

SUMMARY OF THE INVENTION

Several embodiments of the invention advantageously address the needs above as well as other needs by providing a display interface displayed by a collaborative software application running on a computing device of a real-time collaborative control system, the display interface comprising: a target board including a plurality of input choices arranged on the target board; a pointer, wherein a location of the pointer on the target board is updated by the collaborative software application; wherein the collaborative software application is configured to repeatedly perform the steps of: receiving user input from a user of the computing device, the user input indicating a user intent for selecting one of the input choices; sending the user input to a central collaboration server communicatively coupled to the computing device; receiving an updated coordinate location of the pointer on the target board from the central collaboration server; and displaying the updated coordinate location of the pointer on the target board.

In another embodiment, the invention can be characterized as a graphical pointer interface for a display interface of a computing device, comprising: a collaborative application running on the computing device and configured to receive user input via the display interface and update the display interface; a pointer having a center and displayed on the display interface, whereby a coordinate location of the pointer is repeatedly updated by the application; and a user input icon displayed on the display interface and configured to receive user input indicating a magnitude and a direction of movement of the pointer.

BRIEF DESCRIPTION OF THE DRAWINGS

The above and other aspects, features and advantages of several embodiments of the present invention will be more apparent from the following more particular description thereof, presented in conjunction with the following drawings.

FIG. 9 comprises an exemplary graphical magnet pointer of the display interface in accordance with another embodiment of the present invention.

FIG. 10 comprises the exemplary graphical magnet pointer with a magnet icon in a first position.

FIG. 11 comprises the exemplary graphical magnet pointer interface with the magnet icon in a second position.

FIG. 12 comprises the exemplary graphical magnet pointer with the magnet icon in a third position.

FIG. 13 comprises the exemplary graphical arrow pointer of the display interface with an arrow icon in a first position.

FIG. 14 comprises the exemplary graphical arrow pointer with the arrow icon in a second position.

FIG. 15 comprises the exemplary graphical arrow pointer with the arrow icon in a third position.

Figure 1:
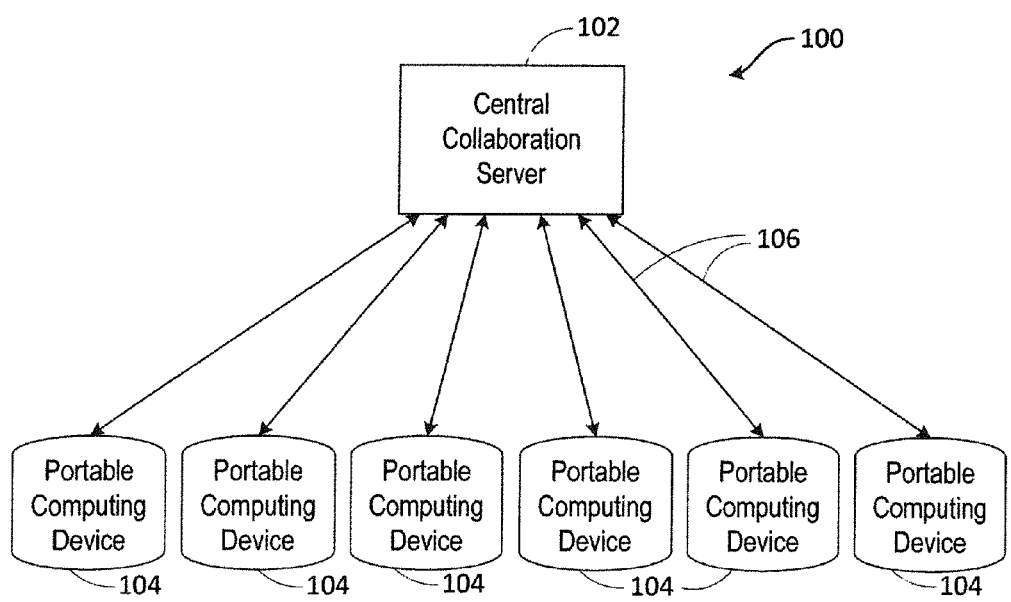
FIG. 1 is a schematic diagram of an exemplary real-time collaborative system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Real-time occurrences as referenced herein are those that are substantially current within the context of human perception and reaction.

As described in related patent application Ser. Nos. 14/668,970 and 14/708,038, the massive connectivity provided by the Internet is used to create a real-time closed-loop collaborative consciousness (or emergent group-wise intelligence) by collecting real-time input from large numbers of people through a novel user interface and processing the collected input from that large number of users into a singular group intent that can answer questions or otherwise take actions or convey will in real-time. The methods use intervening software and hardware to moderate the process, closing the loop around the disparate input from each of the many individual participants and the singular output of the group. In one embodiment, each individual user ("participant") engages the user interface on a portable computing device 104, conveying his or her individual real-time will in response to a prompt such as a textually displayed (or audibly displayed) question as well as in response to real-time feedback provided to the user of the group's emerging real-time intent. This closes the loop around each user, for he is conveying individual intent while also reacting to the group's emerging intent. Thus each user must be able to see not only the prompt that begins a session, but the real-time group intent as it is forming. For example, if the intent is being conveyed as words, the user will see those words form, letter by letter. If the intent is being conveyed as a direction, the user sees the direction form, degree by degree. If the intent is being conveyed as a choice among objects, the user sees a graphical pointer 210 get closer and closer to a particular chosen object. Thus, the user is seeing the group's will emerge before his eyes, reacting to that will in real-time, and thus contributing to it. This closes the loop, not just around one user, but around all users who have a similar experience on their own individual computing device 104. While the embodiments described generally refer to portable computing devices, it will be understood that non-portable computing devices, such as desktop computers, may also be used.

A collaboration system has been developed that allows a group of users to collaboratively control the graphical pointer 210 in order to collaboratively answer questions or otherwise respond to prompts.

Referring first to FIG. 1, a schematic diagram of an exemplary collaboration system 100 is shown. Shown are a Central Collaboration Server (CCS) 102, the plurality of portable computing devices 104, and a plurality of exchanges of data with the Central Collaboration Server 106.

Embodiments of the plurality of portable computing devices 104 and the interaction of the computing devices 104 with the system 100 are previously disclosed in the related patent applications.

The collaboration system 100 comprises a Central Collaboration Server (CCS) 102 that is in communication with the plurality of portable computing devices 104, each portable computing device 104 running the Collaborative Intent Application (CIA), such that the plurality of individual users, each user interacting with one of the plurality of computing devices 104, can provide user input representing a user intent (i.e. the will of the user). The plurality of user inputs is numerically combined to result in a group intent, thus enabling collaborative control of the pointer 210 (or other graphical representation of the group intent) that is manipulated by the group intent to select a target from a group of elements (i.e. input choices) and thereby form collaborative responses. The portable computing devices 104 are in communication with the CCS 102 as shown by the data exchanges 106. In some embodiments, such as a multi-tier architecture, the portable computing devices 104 may communicate with each other. The CCS 102 includes software and additional elements as necessary to perform the required functions. In this application, it will be understood that the term "CCS" may be used to refer to the software of the CCS 102 or other elements of the CCS 102 that are performing the given function.

As disclosed in the related patent applications, in one embodiment each user views a target area 206 as shown below (also referred to as a target board) on a display of his portable computing device 104. Display of the target area 206 is enabled by the CIA of the device 104. In some embodiments the target area 206 comprises the plurality of input choices (e.g. letters, numbers, words, etc.) that can be selected to form a response to a posed query.

In another embodiment, also displayed on the target area 206 is the graphical pointer 210 that selectively moves in relation to the input choices displayed on the target area 206, said motion executed in response to the group intent input of the plurality of users. By collaboratively moving the pointer 210, said plurality of users is enabled to sequentially select targets from the input choices 208 of the target area 206 and thereby produce the collaborative response to the posed query or prompt. In some embodiments, the selection is made when the pointer 210 is positioned on or near the input choice 208 for more than a threshold amount of time. In some embodiments, the pointer 210 is determined to be on or near the input choice 208 if it is within a threshold proximity of the input choice 208. When the target is selected it is added to the emerging answer.

More specifically, embodiments of the current system 100 enable each of the plurality of users to view on their own portable computing device 104, the graphical pointer 210 and the target area 206, and enable each of said users to convey the user intent as to the desired direction (and optionally magnitude) of motion the user wants the pointer 210 to move so as to select one of a plurality of input choices 208 displayed on the target area 206.

The user input is typically represented as a user intent vector, including both a direction and magnitude of the user input. The user intent vector can be input by the user, for example, by tilting his or her computing device 104 in the desired direction. In other embodiments the user intent vector is input by swiping on a touchscreen. The user intent vector is communicated by the CIA running on the user's portable computing device 104, to the Central Collaboration Server (CCS) 102.

The CCS 102 receives the user intent vectors from the plurality of users, and then derives a group intent vector that represents the collective will of the group at that time.

The group intent vector is then used to compute an updated location of the pointer 210 with respect to the target area 206 and input choices 208, the updated location reflecting the collective will of the group.

The updated pointer location is then sent to each of the plurality of computing devices 104 over the network and is used by the CIA software running on said computing devices 104 to update the displayed location of the pointer 210. The result is that each of the plurality of users can watch the pointer 210 move, not based on their own individual input, but based on the overall collective intent of the group.

As shown in FIG. 1, the system 100 comprises a Central Collaboration Server 102 ("CCS") that's in communication with a plurality computing devices 104, each of said computing devices 104 running a Collaborative Intent Application ("CIA"). The system 100 is designed to enable a plurality of users, each engaging an interface of one of said computing devices 104, to jointly control the single graphical pointer 210 through real-time group-wise collaboration. The graphical pointer 210 (also referred to as a puck) is displayed to each user by the CIA application running on his or computing device 104, as coordinated by data received from the CCS 102 over a communication link. Each of the computing devices 104 comprises one or more processors capable of running the CIA routines and displaying a representation of the pointer 210 along with a plurality of other graphics. The computing device 104 could be, for example, a personal computer running a CIA application or a smart phone or tablet running a CIA app. The CIA software can be a stand-alone executable or be code that executes inside a web-browser or other shell.

The CIA software running on each computing device 104 is configured to display a graphical user interface (also referred to as a display interface or a decoupled control interface) that includes at least one graphical pointer 210 and a plurality of input choices 208. In some embodiments, the graphical pointer 210 is configured to look like a "puck" with a central viewing area that is partially transparent. When the pointer 210 is positioned over one of the input choices 208 such that a targeted input choice is substantially within the viewing area for more than a threshold amount of time, that input choice 208 is selected.

Figure 2:
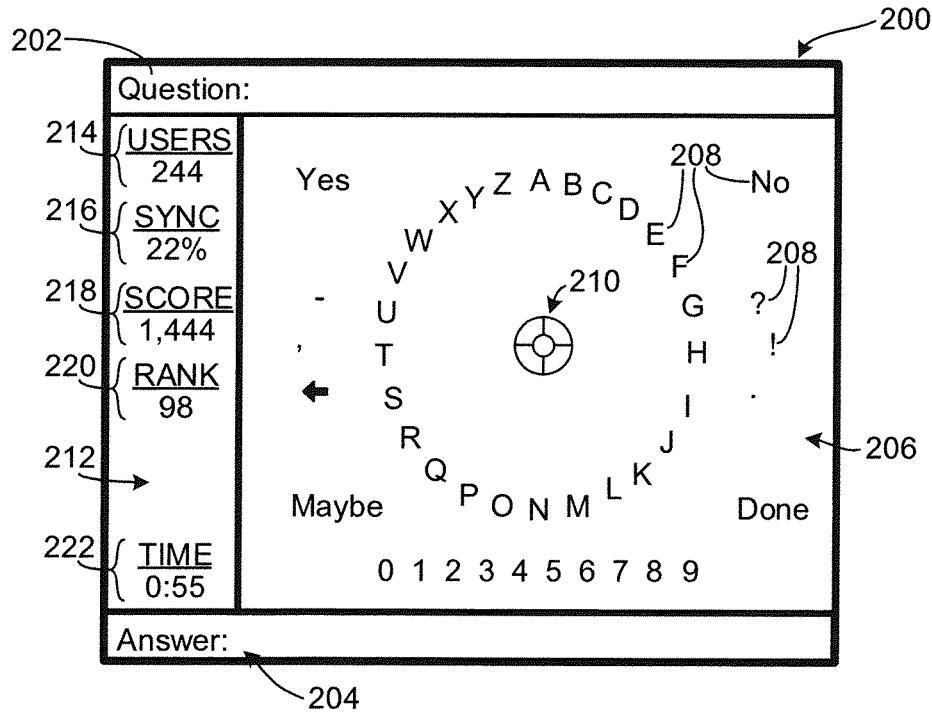
FIG. 2 comprises an exemplary display interface of a computing device of the collaborative system in accordance with one embodiment of the present invention.
Figure 3:
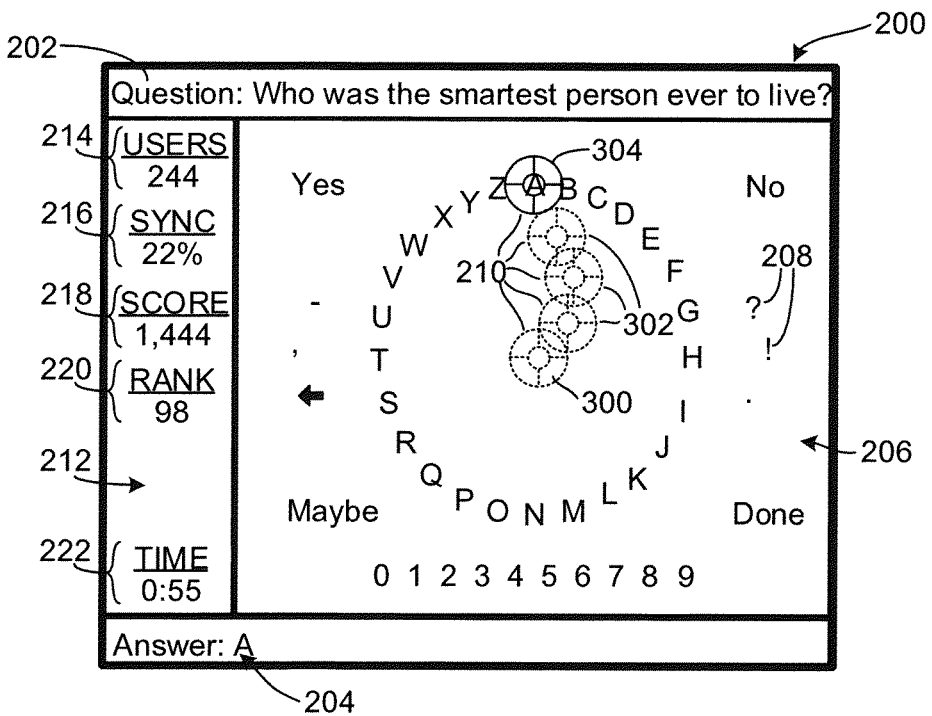
FIG. 3 comprises the display interface of FIG. 2 illustrating a moving pointer.

Referring next to FIGS. 2 and 3, an exemplary display interface 200 is shown in accordance with one embodiment of the present invention. Shown are a prompt bar 202, a response bar 204, the target area 206, the plurality of input choices 208, a pointer 210, an information bar 212, a number of users indication 214, a synchronicity indication 216, a user score indication 218, a rank indication 220, and a response timer 222.

The display interface 200 of FIG. 2 is shown with the moving pointer 210 at a single instance in time, whereas the display interface 200 of FIG. 3 represents a period of time over which the pointer 210 is moved across the target area 206 in response to the group intent. Also shown in FIG. 3 are a first pointer position 300, a plurality of intermediate pointer positions 302, and a target selection position 304.

As shown in FIGS. 2 and 3, the target area 206 is a horizontal rectangular shape, taking up most of the screen area. The narrow horizontal rectangular-shaped prompt bar 202 extends the width of the display interface 200 above the target area 206, and the narrow horizontal rectangular-shaped response bar 204 extends the width of the display interface 200 below the target area 206. The information bar 212 is a narrow vertical rectangular shape, located to the left of the target area 206 and between the prompt bar 202 above and the response bar 204 below. It will be appreciated that many other graphical configurations of the various display interface areas are possible.

The display interface 200 of FIGS. 2 and 3 includes the main target area 206, similar that shown in the target board embodiments of the related applications. The target area 206 includes the plurality of input choices 208, shown in FIGS.

2 and 3 as alphanumeric characters, as well as other input choices 208 such as punctuation characters, an arrow graphic (indicating deletion of a response character), and word input choices (e.g. yes, no, maybe and done). Other inputs choices 208 may also be used, for example, numerical choices on a number line. The target area 206 also includes the moving pointer 210, which is the visual indicator of the group intent, and moves across the target area 206 in response to the group intents derived from the user inputs.

As disclosed in related applications, if the pointer 210 is positioned over one input choice 208 for more than a threshold amount of time, that input choice 208 is selected. The same is true for each of the target words (yes, no, maybe). In addition, a "done" target is included, which when selected, indicates that the response being formed by selecting targets is now complete.

The system 100 is configured such that groups of users are enabled to collaboratively control the pointer 210 in response to prompts (for example, questions) that are posed to the group. In the example of FIGS. 2 and 3, the prompts appear in the prompt bar 202 of the display interface 200, for example, the prompt, "Who was the smartest persons ever to live?" as shown in FIG. 3. A prompt may appear, for example, when one of the plurality of users types in a question, entering it within the prompt bar 202 on the display interface of their computing device 104. The user presses enter and the question then appears in the prompt bar 202 of all the users, becoming the group prompt. The users then collaboratively control the pointer 210 to answer the question or otherwise respond to the prompt. As the group intent selects input choices 208, which are then displayed as part of the response, the answer appears in the response bar 204 on the display interfaces of the plurality of users, thus allowing all to see the result. The system 100 in one embodiment can be configured to only allow one question to be asked at a time, and only allow certain users to ask questions at certain times. This may be achieved by displaying a highlight on the answer bar of users who are currently enabled to ask questions. When a current question is active, the answer bars are not highlighted, for nobody can ask a question until the current question is answered.

In some embodiments a time limit is moderated by the CIA/CCS software such that the users are given a limited amount of time to answer a posed question. In such embodiments, a timer (either numerical or graphical) may be displayed to the users on the display interface indicating how much time is left to answer the given question or prompt. For embodiments where users may be selecting a sequence of letters or words to compose the response, the time limit may be associated with each input choice target selection, thus giving the users a specified time limit for collaboratively making each target selection in the sequence. A second timer may be associated with the collaborative formulation of the complete response. In this way, the system 100 can employ a first targeting timer that limits the time allowed for targeting each input choice 208, and the second response timer that limits the amount of time allowed for the complete response.

The exemplary response timer 222 is shown in FIGS. 2 and 3 within the information bar 212. Also shown within the information bar 212 portion of the user interface is the number of users indication 214, which displays the current number of collaborating users of the system 100 (i.e. current user count). Also shown within the information bar 212 is the user score indication 218, showing a user score rating for the particular user who is engaging the computing device 104 that is running this instance of the CIA software. Thus each user is shown his own individual score, i.e. the user score is unique to each user.

Also displayed in the information bar 212 is the synchronicity indication 216 including a synchronicity value for that individual user, the value indicating how collaborative the user is being with respect to other users (as previously described in the related application Ser. Nos. 14/668,970 and 14/708,038).

In addition, each user can be assigned a rank value, the rank value displayed in the rank indication 220 shown in the information bar 212, the rank value being an indication of standing of that user with respect to other users on one or more performance metrics (as disclosed in the related applications) In some embodiments the performance metrics used for computing the rank value include the user score for each user and the user synchronicity for each user. In some embodiments, the number of questions a user has participated in is also used in computing the rank value and/or score value.

Using the display interface combined with the means for user input, the plurality of users is enabled to collaboratively control the motion of the pointer 210 to select one or more targets from the input choices 208 in response to prompts, thereby formulating an answer through synchronous real-time collaboration. As disclosed in the related patent applications, the plurality of users, each interacting with one of the plurality of computing devices 104, provides user input, which is numerically combined to enable collaborative control of the pointer 210 that is manipulated by group intents to select targets. As further disclosed in the related patent applications, each user views the target board on the display interface of his own computing device 104, as displayed by the CIA application running on the device, the target board comprising at least the target area 206, the prompt bar 202, and the response bar 204.

As shown in FIG. 3, (which represents multiple time-steps over a period of session time) the pointer 210 moves under collaborative control of a plurality of users, heading for a particular letter or number or word. The pointer 210 is moved by the group intent from the initial first pointer position 300, through the intermediate pointer positions 302 and finally to the target selection position 304, which, in the pointer 210 embodiment shown, selects the input choice 208 surrounded by an inner target area of the pointer 210. The exemplary target choice shown is the letter "A". In one embodiment, the CCS 102 is configured to select that input choice 208 if the pointer 210 lands on it for more than a threshold amount of time. The target is then displayed in the response bar 204, added to whatever letters may have already been selected for this response. As shown in FIG. 3, the response bar 204 now includes the character "A" as the first character.

After the target selection, the pointer location can be reset at a center of the screen, and the process repeats, allowing the users to select additional letters, numbers, words, etc., building the complete response. Once the response is complete, in some embodiments the response is shown on the session log display interface 400. In some embodiments, the users are shown a rating display interface for proving user input regarding rating of the answer (i.e., expressing their satisfaction with it). In other embodiments, a Tweet or other social media update may be sent out by the CCS software that includes the question, answer and/or statistics or other information or data about the session.

Figure 4:
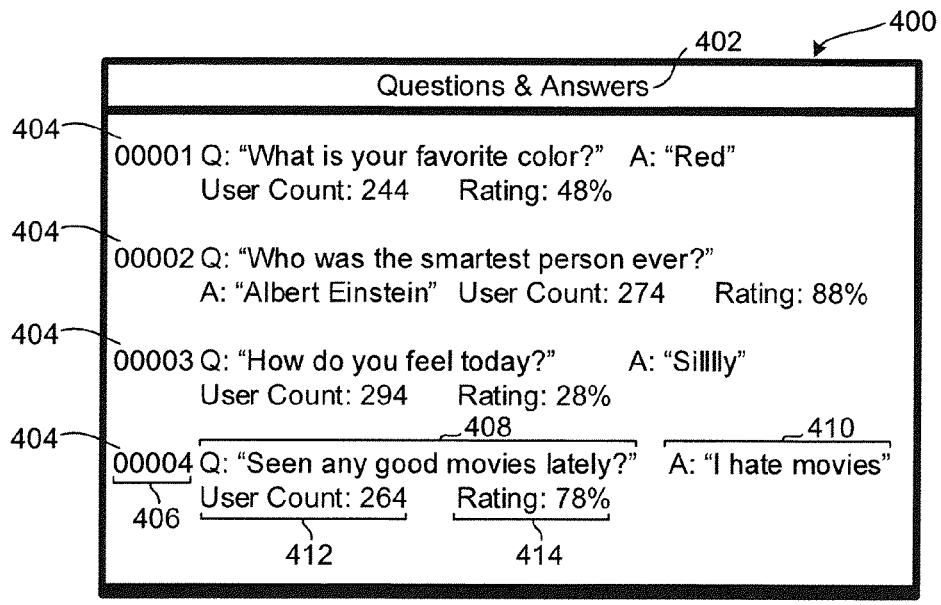
FIG. 4 comprises an exemplary session log display interface of the computing device of the collaborative system in accordance with another embodiment of the present invention.

Referring next to FIG. 4, an exemplary session log display interface 400 is shown. Shown are a display header 402, a plurality of log entries 404, a plurality of session numbers 406, a plurality of session prompts 408, a plurality of session responses 410, a plurality of user counts 412, and a plurality of ratings 414.

The exemplary session log display interface 400 of FIG. 4 includes the display header 402 located at the top of the display, describing the content of the session log display interface 400, in this example, "Questions & Answers". The display interface 400 also includes the plurality of log entries 404, each log entry 404 including information and/or statistics regarding a completed session. In the example shown, each session is represented by a line of text. Each line of text comprising the log entry 404 includes for each session, in order, the session number 406, the session prompt 408, the final response 410, the user count number 412, and the rating value 414. It will be appreciated that any other data, information, and/or statistics regarding the session could be included.

For example, the top log entry 404 includes the session number 406 "00001", indicating a first session. The session prompt 408 includes the text "Q: "What is your favorite color?" The response, as indicated my the session response 410, is "A: "Red". The user count 412 for this session is "244", indicating that 244 users participated in that session. The rating 414 given to the response is 48%.

The example session log display interface 400 can be a display interface generated by the local CIA on each computing device 104. Alternatively, the session log display interface 400 may be a web page that is accessible to users from around the world. The session log display interface 400 lists the questions and answers from previous sessions, so users can browse and see the responses for the various session. This can be a simple list, as shown in FIG. 4, and include some data about each question and answer, for example how many users participated, and the rating the users gave it. In some embodiments, the system is configured to allow users to leave comments related to each question and answer, for example to agree with or debate against the answer generated by the collaborative intelligence.

The answers can be ordered sequentially (by time and date of the session). In some versions, the answers can be ordered by rating, thus letting people easily browse the highly rated answers. In some versions, all registered users can add to the ratings by browsing the page, not just the users who participated in that particular question/answer session. The rating in some embodiment can be a "thumbs up" indication.

In this way, the session log display interface 400 is a source of entertaining information for users, allowing them to see the historical responses produced by the group-wise collaborative intelligence. In many embodiments, the users who can access the session log display interface 400 and view the content are not limited to those who collaboratively produced answers to questions, thereby allowing a wider pool of users to enjoy the output from the collaborative sessions. In addition, embodiments can be configured in which many "collaboration rooms" with different groups of users operating in parallel, each group including users who control the pointer 210 for that group and engage in collaborative decision making. With many groups, each generating their own questions and producing their own collaborative responses, the session log display interface 400 can be configured to post the output from a plurality of groups in a centralized place. This allows a wide range of users to see the collaborative thinking that emerged from the plurality of groups in a fast and easy way. In such embodiments, the session log display interface 400 can additionally display additional data along with each question/answer pair, for example a name of the specific "collaboration room" from which it emerged, a number of users who contributed to the answer, an elapsed time used to collaboratively generate the answer, and one or more measures of synchronicity among the group who produced that answer while producing that answer.

The session log display interface 400 may additionally be configured to allow users who view the session log display interface 400 to rate answers shown on the displayed session log display interface 400 through simple asynchronous polling methods. In this way, the system 100 can employ a combination of the novel synchronous collaboration to generate answers along with more traditional asynchronous rating/polling to let users rate, rank, or otherwise subjectively quantify the quality of the answers.

As described above and in the related applications, the CIA and CCS software are configured to allow users to form collaborative groups enabled to answer the prompt collaboratively through the group-wise, real-time synchronous control method. In some embodiments the CIA/CCS system 100 is enabled to automatically ask questions to the group, selecting from a store of predefined questions. This is useful in getting the group started, or when no member of the group poses a question within a certain time limit. Conversely, in many situations the users are eager to ask questions and because only one can be answered at a time (in a particular collaboration room), there can be a backlog of questions and/or competition to get questions asked. Thus because there may be many collaborating users who may wish to ask a question at any given time, the system 100 can be configured to store pending questions in a question queue. This may be configured as a displayed list of questions, ordered, for example, such that the question at the top is answered next and proceeding downward. In this way, users can pose the question and see where it sits on the list over time, as previously asked questions get answered. This has the benefit of encouraging users to participate for long periods, waiting for their question to reach the top of the queue, at which point it becomes the active question for the group, an indication of such sent to all the users.

For embodiments that support question queuing functionality, the system 100 can also be configured to order the questions based on factors other than the order in which the questions were submitted. For example, in a preferred embodiment, the system 100 can be configured to give question-asking priority to users who have earned a high score or achieved high ranking during collaborative control sessions, their questions boosted up the queue based on their score. As described in the related patent applications, such scores and/or rankings are generally based on how collaborative the user has been during prior collaborative sessions.

In many instances, the user may pose a bad question to the group, because the question is not appropriate or not coherent or simply not interesting to the other users of the group. To address such situations, the system 100 can be configured to allow the group-wise intelligence to select a "bad questions" response to the prompt. This is a spatially arranged element that can be selected by the pointer 210, under group-wise control, and when selected indicates to the system 100 that the group does not want to answer the question. The question is then skipped, so another question can be asked (or pulled off the question queue).

This feature encourages users to ask quality questions. The user knows that if he does not ask a quality question, then the group-wise intelligence may immediately decide to deem it a "bad question" and remove it.

To further encourage users to ask quality questions, the system 100 can also be configured to subtract points from users who ask questions that are deemed "bad questions" by the group. In this way, there is a penalty associated with asking the bad question. Further, if the user's score is used by the system 100 to award the right to ask questions, a user who repeatedly asks bad questions and loses points, will get fewer and fewer opportunities to ask additional questions. This enables the collaborative intelligence system 100 to "silence" individual users who are not asking quality questions (or who are deliberately being disruptive).

As was described above with respect FIGS. 2 and 3, some embodiments of the present invention employ the single target area 206 that provides the group of users with the set of input choices 208 through which they can collaboratively craft the response, the choices 208 optionally including simple words (e.g. yes, no, maybe) as well as letters, numbers, and/or punctuation. This target area 206 is highly flexible, for it allows an infinite variety of questions to be answered, but the process of spelling out answers, letter by letter, can be slow. In many situations, the quickest and most satisfying way to ask questions and arrive at answers is to provide users with a set of choices that are well fitted for the question that was asked.

To create a flexible system that enables this in a clean, intuitive, and easily adjustable way, a novel framework has been devised that employs a plurality of selectable target areas 206, each of said target areas 206 having a different set of input choices that can be collaboratively selected from. In some embodiments the user who asks the question can also indicate which of the selectable target areas 206 should be used to answer the question. In some embodiments, the collaborative group itself is given the ability to select among the selectable target areas 206, thus taking control not just of the selected answer but the pallet of possible answers.

In many preferred embodiments, both methods are employed such that the user who asks the question can optionally specify which selectable target area 206 to use to answer the question, while at the same time the group can collaboratively override the recommendation and choose a different selectable target area 206.

Figure 5:
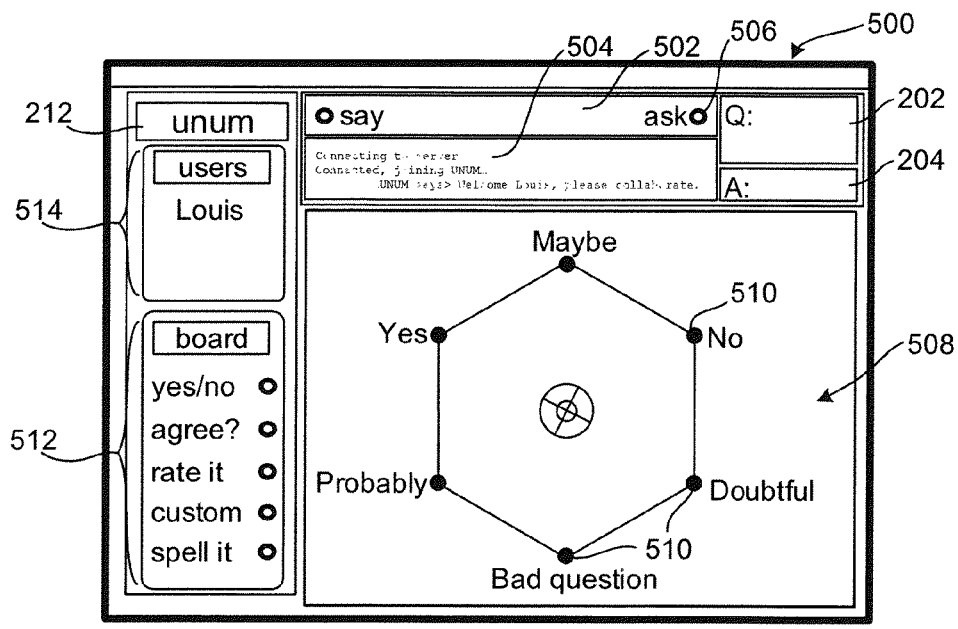
FIG. 5 comprises an exemplary yes/no display interface of the computing device of the collaborative system in accordance with another embodiment of the present invention.

Referring next to FIG. 5, an exemplary display interface 500 including a yes/no target area 508 is shown. Shown are a user communication area 502, a message area 504, the response bar 204, the prompt bar 202, an ask light icon 506, the yes/no target area 508, a plurality of yes/no input choices 510, the information bar 212, the pointer 210, a board menu area 512, and a user log 514.

FIG. 5 shows one embodiment of the collaborative display interface. The main elements are generally similar to those previously shown in FIGS. 2 and 3: the target area 508 (in this example the yes/no target area 508), the prompt bar 202, the response bar 204, and the information bar 212. The yes/no target area 508 includes the plurality of yes/no input choices 510 and the pointer 210.

Shown in FIG. 5 is one embodiment of a working version of a display interface of the real-time synchronous collaborative system 100 disclosed herein, the system 100 in this embodiment employing CIA software that runs in the internet browser of the computing device 104. Each instance of the CIA code establishes real-time communication with the central collaboration server 102 running the CCS software which receives user input from the plurality of users and updates the location of the pointer 210 accordingly. The CIA software first shows on the display interface a login screen where users sign in with a user name and a password. New users are given the ability to create new user names and passwords, and/or users may be given the ability to sign using a Facebook ID, a Google+™ ID, or other online ID that has been associated with the collaborative system 100. In this way, users provide a unique name that identifies them. The CCS software then maintains data such as a score value, for each unique user.

The collaboration display interface, examples of which are shown in FIGS. 3, 4, and 5-8, are displayed to each user after the user logs in. The display interface in some embodiments includes the user log 514 in the information bar 212 on the left side of the display interface. The user log 514 lists the user name of the unique users who are currently participating in the current collaborative session. The current session could include 20 users who all chose to enter the same "collaboration room" as previously described. The user log 514 as shown in the display interface 500 of FIG. 5 below only lists a single name "Louis" because at this moment in time, the user "Louis" is the only user to join. As other users join, their names would also appear in the user log 514. In addition, in this embodiment the prompt bar 202 includes the message area 504, where users can type messages that are seen by other users who are logged into the same session. Additionally, messages can be displayed to the user by the system 100. At the moment in time shown, user "Louis" just joined, so the message bar displays a message from the system 100: "<UNUM says> Welcome Louis, Please Participate." Similar messages are displayed to other users as they join.

Once logged into the server 102, in some embodiments the user can join one of the plurality of collaboration rooms, each collaboration room being the separately hosted group of users engaged in the collaborative experience. For example, the server 102 might allow the user to join one of 200 collaborations rooms, each of said rooms supporting up to 30 users who can chat, ask questions, and collaboratively answer questions among them. In some embodiments, the rooms are filled in a first-come, first-served manner, new rooms being created when a current room is filled with the maximum number of users. In some embodiments, rooms can be assigned a theme, which is a guideline for the topic to be debated (with questions and answers). For example, some collaboration rooms can be general purpose, some can be sports-related, some can be media-related, some can be finance-related, some can be political, some can be issue-related, etc. In some embodiments, collaboration rooms can be public or private. A public room can be filled with strangers who join in at will. A private room can be filled by invitation. In some embodiments, the user can invite his or her Facebook friends for participation in a custom room. Such a room is ideal for a group of friends asking personal questions. In some embodiments, there is also a single large room that can support hundreds, or thousands, or even millions of users, which is thereby a much larger experience than the small rooms that support 30 users. This large room creates a genuine global collective intelligence and can be assigned a unique name, for example "UNUM" (Unum is Latin for "the one").

In some embodiments, themed rooms can be designed with themed target areas that are specific to the topic of discussion in the room. For example, a finance related room could employ a specialized target area 206 that includes input choices 208 such as "buy", "sell", "hold", and "short".

In some embodiments, the CCS 102 stores historical values related to each registered user, said historical values including the number of past sessions that the user participated in, user scores and/or synchronicity values for those sessions, and/or other pieces of data that indicate the user's skill in collaborating. In some such embodiments, certain collaboration rooms are restricted only for users who have achieved scores or other metrics that surpass a defined threshold. In this way, some rooms can be filled by the CCS 102 with novice collaborators while other rooms can be filled with experienced collaborators. In some embodiments, users can name the collaboration room, which can also be used as the name of the collaborative intelligence that emerges from that room. In some such embodiments, collaboration rooms of one name can compete with collaboration rooms of another name.

By allowing collaboration rooms to be populated by unique groups of users, each room uniquely named, the system 100 can be configured to allow a first collaboration room to ask a question that is directed at a second collaboration room. That second collaboration room can then answer the question as a group. In this way, two collaboration rooms can hold a conversation and/or debate. This allows one collective intelligence to communicate with and/or debate against another collective intelligence.

In some embodiments, collaboration rooms can be populated by selecting users based in part on personal profile data that is stored upon registration. For example, one collaboration room could be populated by users who self-identify as Democrat. Similarly, one collaboration room can be populated by users who self-identify as Republican. These two collaboration rooms can then be enabled through moderation by the CCS 102 to send questions and/or answers to each other, using the methods disclosed herein. In this way, a "Democratic Collaborative Intelligence" emerging from one collaboration room can hold a conversation with and/or hold a debate against, a "Republican Collaborative Intelligence" emerging from another collaboration room. Similarly, a room filled with Raiders fans can be enabled to hold a sports related conversation with, or hold a sports related debate against a room filled with 49er fans. Similarly a room filled with Stanford alumni can be enabled to hold a conversation with or engage in a debate against a room filled with Harvard alumni. In this way, the present invention allows for groups of likeminded people to pool their intelligence and converse with (and/or argue against) groups of other people, thereby creating an entirely new form of human communication.

As soon as two or more users are present in the collaboration room (i.e. have joined the current session), users would have the ability to chat with each other by typing a message in the user communication area 502 at the top of the prompt bar 202. Any message typed in will be sent to all other users, with an indicator of who said it. This allows groups of people to chat using standard functionality. In addition, users can ask questions, to the whole group, that are intended to be answered collaboratively. The software indicates a time period when the question can be asked by lighting up the ask light icon 506 that is positioned near the message bar. If the ask light icon 506 is shown as lit, the user can enter the question into the user communication area 502, then click the ask light icon 506, and the question is sent to all users. The question appears in the prompt bar 202. In the embodiment shown in FIG. 5, the prompt bar 202 includes the text "Q:", indicating that whatever follows is the session's question.

Once the question (i.e. prompt) appears in the prompt bar 202 for all users of the group, the users are instructed collaboratively control to answer the question, providing user input trying to move the pointer 210 towards one of the provided input choices. As shown in FIG. 5, the yes/no target area 508 includes six possible yes/no input choices 510 spatially arranged such that each yes/no input choice 510 is approximately equidistant from a starting location of the pointer 210 (in this embodiment, the starting location is centered on the yes/no target area 508). This equidistant configuration is novel in that it helps ensure a relatively equal chance that any of the input choices will be selected, unbiased by the layout so that the will of the group is solely what causes a particular answer to emerge collaboratively.

In the yes/no target area 508 shown in FIG. 5, the yes/no input choices 510 include "yes", "no", "maybe", "probably", "doubtful" and "bad question". This type of board is highly effective for yes/no-type questions.

Of course, not all questions are yes/no in nature, and thus the present invention provides for other types of target areas 206 that are selectable by the user who asked the question and/or by the groupwise control of the pointer 210. In the embodiment of FIG. 5, indications of these other available target areas 206 are included in the board menu area 512 that is displayed in the bottom half of the left-hand information bar 212. As shown in FIG. 5, the different selectable target areas 206 in the menu include "yes/no", "agree/disagree", "rate it", "custom" and "spell it". These are given as examples, but it should be understood that a wide variety of other target areas 206 could be provided. For example, for sports questions a "win/lose" target area could be provided. For finance questions a "buy/sell" target area could be provided. For romance questions, a "love/hate" target area could be provided. It should be noted that the target area 206 can display a small set of discrete choices, such as the hexagon of six choices shown in FIG. 5, or the target area 206 can display a range of continuous choices, for example to enable a range of rating values from 0% to 100%. For simplicity, this application will describe only the target area types disclosed in FIG. 5.

If a yes/no-type question is asked to the group using the display interface 500 shown in FIG. 5, the users might collaborate to move the pointer 210 to land on the yes/no input choice 510 "doubtful". If so, the word "doubtful" appears in the response bar 204 (in this embodiment included as part of the top prompt bar 202). In the embodiment shown, the response bar 204 includes the text "A:", indicating that whatever follows is the session's answer. In addition, "<UNUM says> doubtful" appears in the message area 504 for all users.

In one embodiment of the present invention, selection by the user of the specific target area 206 employs simple command codes added to the end of the question. For example, the user could type in the question "What do you think of the Rolling Stones?" and then add the command code "/rate" to the end of the string. This command code would be previously set in the CCS software to indicate that the "rate it" target area should be used. Alternatively, target area selection buttons could be provided on the display interface 500 for the user to select.

Figure 6:
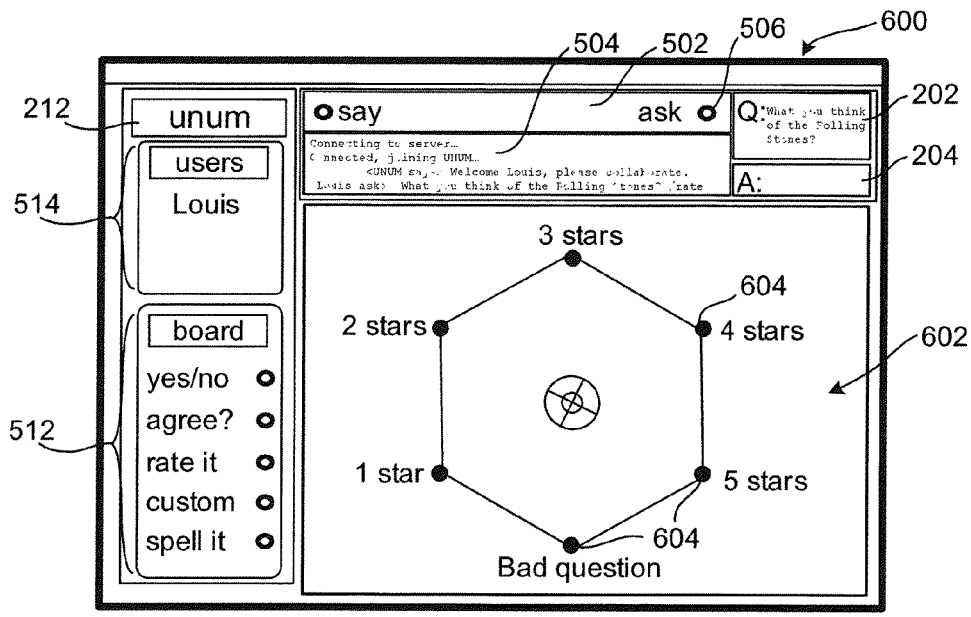
FIG. 6 comprises an exemplary "rate it" display interface of the computing device of the collaborative system in accordance with another embodiment of the present invention.

Referring next to FIG. 6 an exemplary display interface 600 including a "rate it" target area 602 is shown. Shown are the user communication area 502, the message area 504, the response bar 204, the prompt bar 202, the ask light icon 506, the "rate it" target area 602, a plurality of "rate it" input choices 604, the information bar 212, the pointer 210, the board menu area 512, and the user log 514.

As shown in FIG. 6, once the user has typed in the question and indicated the desire to use the "rate it" target area 602 as the spatially arranged field of possible answers, the "rate it" target area 602 appears on his display interface 600 as well as on display interfaces of all the collaborating users. In addition, the question appears in the prompt bar 202. As shown, the words "What do you think of the Rolling Stones?" appears in the prompt bar 202. Also, the user's full question, with command code, appears in the message area 504. This allows all users to see what the user typed to enter the question, instructing everyone about the proper use of command codes.

Now the users can answer the question by collaboratively moving the pointer 210 to one of the spatially arranged "rate it" input choices 604. In one example, the pointer 210 moves to a "5 stars" input choice 604 and that answer is broadcast to all the users, as well as, in some embodiments, added to the session log. The answer could optionally be Tweeted® out by the software. It should be noted that this rating is not the average of a number of asynchronous ratings as would be achieved by a simple poll, but is a jointly derived rating that happens through a physical negotiation of the users, arriving at a consensus not an average. This consensus is a genuine group opinion and not merely the average of a set of individual opinions, thus achieving a true collaborative intelligence.

In this way, questions can be asked that are associated with a group of input choices that are spatially arranged. A sports question could have answers "win", "lose", "tie", "too close to call", "blow out", for example. In some embodiments, as previously described, the "bad question" input choice may be included so users can collaboratively reject bad questions.

Figure 7:
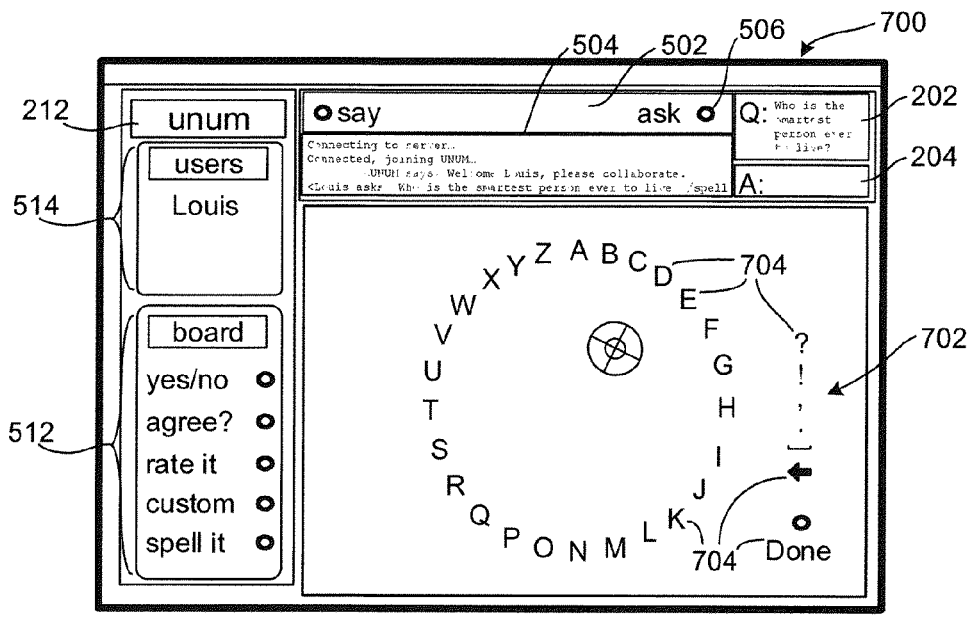
FIG. 7 comprises an exemplary "spell it" display interface of the computing device of the collaborative system in accordance with another embodiment of the present invention.

Referring next to FIG. 7, an exemplary display interface 700 including a "spell it" target area 702 is shown. Shown are the user communication area 502, the message area 504, the response bar 204, the prompt bar 202, the ask light icon 506, the "spell it" target area 702, a plurality of "spell it" input choices 704, the information bar 212, the pointer 210, the board menu area 512, and the user log 514.

In yet other embodiments, the system 100 employs the "spell it" target area 602 including the "spell it" input choices 604 that can be selectively chosen, either by the user who asks the question, or by the group (for example, by the group collaboratively moving the pointer 210 over the spell it option in the board menu area 512).

As shown in FIG. 7, one user has asked the question "Who is the smartest person ever to live?" (as shown in the prompt bar 202) and has indicated that the group should answer with the "spell it" target area 602, this indication in one embodiment provided by the command code "/spell" added to the end of the question, as shown in the message area 504.

The "spell it" target area 602 in one embodiment includes punctuation as well as space and backspace, allowing users to write multiple words, or erase letters through collaborative action. The "spell it" target area 602 includes a "done" input choice so the group can collaboratively decide when the sequence of chosen letters is complete.

Figure 8:
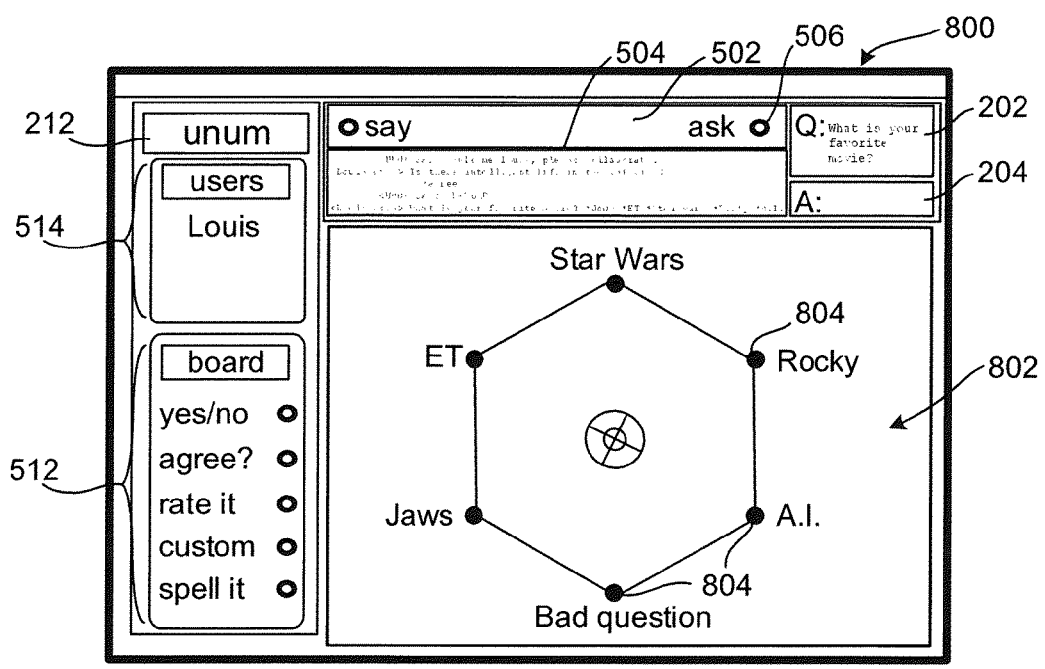
FIG. 8 comprises an exemplary custom display interface of the computing device of the collaborative system in accordance with another embodiment of the present invention.

Referring next to FIG. 8 an exemplary display interface 800 including an exemplary custom target area 802 is shown. Shown are the user communication area 502, the message area 504, the response bar 204, the prompt bar 202, the ask light icon 506, the exemplary custom target area 802, a plurality of "rate it" input choices 804, the information bar 212, the pointer 210, a board menu area 512, and a user log 514.

In some cases the question might be posed by one user that does not fit any of the predefined sets of input choices provided by any of the available choices of target areas 206, and yet the user does not want to leave the input choice selection open-ended, as with the "spell it" target area 702.

To solve this problem, a novel solution has been derived that allows users to quickly ask the question while easily specifying the custom set of input choices 804 to be spatially arranged on the custom target area 802 for selection by the group. This is the "custom board" target area 802 as shown in FIG. 8

As shown in the exemplary display interface of FIG. 8, one user asks the question, "What is your favorite movie?" The user doesn't want the group to answer using the "spell it" target area 702, but instead desires the display of the plurality of custom input choices 804. To enable this, a novel command code methodology has been developed in which the user can type the set of custom input choices 804 into the message area 504 along with the question. In one embodiment this is enabled through the use of a simple command code (in one embodiment the "*" character) put before each of the custom input choices 804. This code identifies that the words that follow it comprise available choice in the custom set. In the particular case of FIG. 8, the user typed in: "What is your favorite movie? *Jaws *ET *Star Wars *Rocky *A.I.", as indicated by the text shown in the message area 504.

The CIA software running on the user's local computer sends a representation of this text to the CCS 102. In response, the CCS 102 sends the question portion of the text to the computing devices 104 of each participating user, for display in the prompt bar 202 on their screen. In addition, the CCS/CIA software crafts the custom target area 802 that is displayed on the display interface 200 of each computing device 104, said custom target area 802 including the custom input choices 804 in a spatially arranged format. In the example of FIG. 8, the movie input choices—"Jaws", "E.T.", "Star Wars", "Rocky", and "A.I."—are displayed to each of the users as part of the custom configured hexagonal target area 802, each of the five movies at a corner of the hexagon, with the sixth corner being assigned the input choice "Bad Question". In this way, users can ask highly targeted questions that are unique, but bounded, giving the group a very specific set of answers to choose from. It's important to note that data sent from the central server 102 to each computing device 104 indicates both content of the plurality of input choices 208 as well as spatial arrangement of each input choice 208 in the target area 206. In this way, the displayed target area 206 is fully customizable, allowing for coordinated control over which choices go where.

As described in detail in the aforementioned related patent applications, the CIA/CCS software enables the group of users to each impart their own individual input so as to collaboratively control the motion of the graphical pointer 210, said pointer 210 moving under group-wise control to answer questions or otherwise respond to prompts.

In a preferred embodiment, a physically intuitive metaphor is employed such that the pointer 210 is assigned a simulated mass and a simulated damping (friction) with respect to the target area 206. Each user is told that their personal user input acts to apply a simulated force upon the group-wise pointer 210 by imparting a group force vector upon it, said group force vector based on the user intent vector described in the related applications. The pointer 210 then moves in response to a vector sum of the applied forces. It can be a simple sum (or average) in which each user input is counted equally, or it can be a weighted sum (or average) in which the input from some users has more impact than others. As described in the related applications, the weighting process can be based on user scores earned during previous sessions.

Thus the intuitive conceptual model is provided to users wherein the plurality of user force vectors are applied to the pointer 210 based upon input conveyed by each user into their individual computing device 104. This is achieved by computing and imparting the group force vector upon the pointer 210 that is the sum or average of the user input force vectors. The computing and imparting is performed the CCS 102 which collects the real-time input from the users, computes the resultant vector, and applies it to a physics-based model controlling the graphical movement of the displayed pointer 210. The physics-based model considers a pointer mass, a environmental damping coefficient, and a current vector motion (velocity and acceleration) of the pointer 210, and determines an updated vector motion of the pointer 210 resulting from the current group force vector. Because the users are continually providing user inputs, the group force vector is repeatedly calculated, the group force vector repeatedly applied, and the vector motion of the pointer 210 repeatedly updated. In some embodiments, this is performed at rates of at least 10 updates per second, but ideally 30 to 60 updates per second. In some embodiments pointer motion is interpolated between updates based on the physics model. Even when no forces are applied by the users, the pointer 210 may maintain momentum and will continue to move for a period of time before stopped by damping.

Providing the intuitive conceptual model for group-wise control of the single pointer 210 is helpful, but there is still a need for an intuitive graphical user interface that makes supports the model, making it natural, intuitive, and fun. The challenge of the pointer interface is that unlike traditional user interfaces where a user's action has a direct and apparent impact on the object they are intending to control (e.g. the pointer 210), this collaborative system 100 is such that the motion of the pointer 210 is not based on the user's input but is based on the group input. Because of this, the user may impart a desire for the pointer 210 to move left at a given moment, but if the group intent is determined from the group of users as a desire for the pointer 210 to move right, the pointer 210 will move right. This can be disconcerting to the user, for the user's input and the motion of the pointer 210 can be significantly misaligned. In fact, users may even wonder if their user input is being considered by the system 100 at all if each user sees no direct evidence of their user input—each user sees only the pointer 210 moving in ways that appear to have no relation to the individual user intent. This is especially true when large numbers of users collaborate, for one user's input may have a very small contribution to the overall group intent. Thus, a significant need exists for intuitive graphical user interface methodologies that allow the individual user to see a result of his or her input, while also making the overall physical metaphor as clear and simple and intuitive as possible. More specifically, there is a substantial need to create a new type of user interface that intuitively links but substantially decouples the representation of each user's personal input from the motion of the collaborative controlled pointer 210. Some embodiments of intuitive graphical user interface methodologies have been described in the related patent applications.

Referring next to FIG. 9, a graphical representation of a graphical magnet pointer interface 900 is shown, in one embodiment of a intuitive graphical user interface methodology. Shown are the pointer 210, a pointer vertical axis 902, a magnet icon 904, a magnet axis 906, an angle 908, and a pointer center 910.

The graphical magnet pointer interface 900 is a methodology for user input that supports a physically intuitive model for group-wise control of the graphical pointer 210. It employs the magnet icon 904 that is provided to each user for display on their personal computing device 104 (as controlled by the instance of the CIA software running on the user's personal computing device 104). In the embodiment shown, the magnet icon 904 is a "U" shaped magnet icon, but other types of magnet icons can be used, and/or other elements that graphically represent a physical pull force. In this way, each user can see his own magnet on his own screen, said magnet icon 904 being directly responsive to the user input provided by said user. Because the control of the magnet icon 904 is handled locally by the personal computing device 104, the graphical magnet pointer interface is highly responsive and not impacted by communication lag with the CCS 102, thus allowing each user to feel like he has a high-bandwidth highly responsive link into the system 100. The position of the magnet icon 904 on the user's display interface 200 may be controlled by a mouse coupled to the computing device 104 and used by the user, with a conventional mouse arrow icon changing to the magnet icon 904 when the mouse cursor nears the graphical pointer 210 that is also displayed on the display interface 200. The magnet icon 904 is displayed at the location of the mouse arrow icon, but is configured in the software to always point towards the center 910 of the circular pointer 210. Thus as the magnet icon 904 approaches the pointer 210, the magnet icon 904 appears to aim at the pointer center 910 as if the magnet icon 904 is magnetically attracted to the pointer 210.

In addition, the software controlling the magnet icon 904 may be configured to increase a size of the magnet icon 904 in size as the magnet icon 904 moves closer to the pointer 210, which would imply a larger magnetic force between the magnet icon 904 and the pointer 210. Thus, with a very simply graphical metaphor, the user understands without instruction that he can apply a virtual pull force on the pointer 210 (representing his user intent vector) that aims from the pointer center 910 to the location of the cursor (i.e. the magnet icon 904) controlled by the mouse.

As shown in FIG. 9, the CIA software can be configured on each personal computing device 104 to display the graphical magnet icon 904 at the cursor location controlled by the user's mouse, trackpad, trackball, touchscreen, or other means for user input of the computing device 104. The magnet icon 904 is configured to appear only when the user's cursor location is within a threshold proximity of the group-controlled pointer 210, for that means the user intends to convey user input regarding his personal intent as to which direction the pointer 210 should move. The magnet icon 904 is configured to automatically point towards the pointer center 910, as if magnetically attracted to it. This conveys an intuitive feeling to the user that by positioning the magnet icon 904 near the pointer 210, he is applying the magnetic pull on the pointer 210. The CIA software then sends the user intent vector to the CCS 102 indicating the angle 908 of the magnetic pull. In the embodiment shown in FIG. 5, the longitudinal magnet axis 906 of the magnet icon 904 is the axis of symmetry of the singly-symmetric magnet icon 904. The angle of direction is the clockwise angle 908 between the pointer vertical axis 902 and the magnet axis 906. In the example shown in FIG. 9, the angle 908 is approximately 330 degrees.

In some embodiments, magnitude of the user input can be graphically conveyed by how close or far the user positions the magnet icon 904 to the pointer 210. The closer the magnet icon 904 to the pointer center 910, the stronger the magnitude of the user input (i.e. the "magnetic force"). To make this visually intuitive, the magnet icon 904 increases in size as the magnet icon 904 moves closer to the pointer center 910. Once the magnet icon 904 overlaps the pointer 210, the magnet icon 904 may be limited from getting too close the pointer center 910 (i.e. from covering a central targeting area of the pointer 210). Thus the magnet icon 904 appears when the input cursor gets within certain proximity of the pointer 210, increases in size as the cursor nears the pointer 210, and disappears if the cursor gets too close to the pointer center 910, the magnet icon size increasing as the magnet icon 904 moves closer to the pointer center 910.

Referring next to FIGS. 10, 11 and 12, exemplary magnet icon pointer configurations are shown. Shown in FIG. 10 is a first magnet pointer configuration. Shown in FIG. 11 a second magnet pointer configuration, and shown in FIG. 12 a third magnet pointer configuration.

FIGS. 10, 11 and 12 show example configurations of the magnet icon 904 and associated pointer 210 at various points in time. The pointer 210 will be moving across the display interface 200 based on the group intent as determined by the CCS 102 and sent to each computing device 104 to be displayed on the display interface by the CIA. The magnet icon 904 is controlled by the user input in conjunction with the CIA software residing on the computing device 104, the magnet icon 904 representing the desired magnitude (size of magnet) and direction (position/orientation of magnet) of the user intent. Based on the magnitude/direction/position of the magnet icon 904 with respect to the pointer 210, the CIA software sends the user intent vector to the CCS 102 for use in deriving the next group intent.

As shown in FIG. 10, the first magnet icon 1002 has a medium size compared to the second magnet icon 1102 of FIG. 11 and the third magnet icon 1202 of FIG. 12. This indicates a medium magnitude of intent. The first magnet icon 1002 has been located by the user in a direction as defined by the first angle 1000, shown to be approximately 50 degrees.

As shown in FIG. 11, the size of the second magnet icon 1102 is smaller than the first magnet icon 1002 and the third magnet icon 1202, indicating a relatively small magnitude of user intent. The second magnet icon 1102 has been located by the user in a direction defined by the second angle 1100, shown to be approximately 230 degrees.

As shown in FIG. 12, the size of the third magnet icon 1202 is larger than the first magnet icon 1002 and the second magnet icon 1102, indicating a relatively larger magnitude of user intent. The third magnet icon 1202 has been located by the user in a direction defined by the third angle 1200, shown to be approximately 310 degrees.

The CCS 102 sums the user intent vectors from the plurality of users, computes the group intent vector, uses the group intent vector to apply the group force vector to the simulated physical model of the pointer 210 (mass, damping, etc. . . . ), and based on the physics model sends the pointer 210 coordinate information to each computing device 104, each of which are then updated with the new location of the pointer 210.

The result is the satisfying, intuitive, informative, and fun method by which individual users can convey their intent/will upon the graphical pointer 210 that is being controlled not by them individually, but by the group of users who are all applying real-time synchronous control input.

As described previously, some embodiments weight the input from all users equally. In such embodiments, the magnet icons 904 on the display interfaces of all individual users can employ the same mapping between size and distance to the pointer 210. However, for embodiments that weight users differently, magnet size can be scaled accordingly. In this way, the user who is being granted a higher contribution rate to the group due to earning points, can see a larger magnet icon 904 on their screen than the user who has been granted a lower contribution rate to the group. This provides visual intuition.

In general, users only see their individual magnet icon 904 on their screen. In some embodiments, however, the system 100 can be configured to allow the user to see a representation of the magnets controlled by other users. In such embodiments "ghost magnet" icons representing user inputs from other users are employed. The ghost magnet icons are largely transparent, thus making the ghost magnet icons easily distinguishable from the user's own magnet icon, and thus preventing the ghost magnet icons from obscuring other important elements on the display interface. If the user is collaborating along with 19 other users, the user might thus see one solid magnet icon 904 (under his own control) and 19 ghost magnet icons that represent the real-time user input being conveyed by the other users. The ghost magnet icon for one of the other users would only appear when that user is positioning his mouse near the representation of the pointer 210 on his display interface 200. The ghost magnet icons in some embodiments may resemble a swarm of bugs hovering around the pointer 210. When all ghost magnet icons are evenly distributed around the pointer 210 (accounting for both magnitude and direction), the net effect cancels out and the pointer 210 does not move. But as the group finds consensus, a majority of the magnet icons would be seen to group themselves on one side of the pointer 210, and the pointer 210 will move. Such a display helps to convey the group-wise behavior of the users which in many ways emulates swarms of bugs or flocks of birds. The ghost magnet paradigm is a graphical representation of this swarm-like behavior.

That said, seeing the ghost magnet icons during the collaborative session could disrupt performance of each individual user, giving each user too much insight into the behavior of the other users, even enable the user to game the system 100. Thus, another innovative method is not to show the ghost magnet icons in real-time, during the control of the pointer 210 to answer the question, but instead to store a history of the motion of the plurality of ghost magnet icons and magnet icon 904 in the CCS 102 and to allow users to see a replay of the session with all instances of magnet icons visible. In this way, the user can participate in the session, seeing only his own magnet icon 904 (representing his user input) and the group-wise pointer 210 that represents the will of the group. The pointer 210 will move (if consensus is achieved) and answer the question. Then, after the group-wise response is crafted and posted for all to see, individual users can ask to see the replay of the session, and in that replay view the history of the magnet icons, showing how the group came to the consensus, thus forming the collaborative intelligence that answered the question.

Viewing all magnet icons during the replay (or in real time) has the benefit of revealing to the users how different the real-time group-wise synchronous control system 100 is from an asynchronous poll, for the motion of the group of magnet icons reveals the collaborative process that is not a simple vote but instead a negotiation, the users finding a solution that's highly agreeable for the participants, users having to adjust their view in real time to form a consensus. In this way, the current system 100 does not merely collect views and average them, the way a vote would, but encourages the formation of the totally new "group view" that may not reflect the will of any particular individual, but does reflect the view of the group. As a result, the unique system 100 disclosed here can be seen as creating an artificial sentience with its own views and opinions and personality traits that emerge in real time through dynamic negotiation.

Referring next to FIGS. 13, 14, and 15, exemplary tilt arrow pointer configurations are shown in one embodiment of the present invention. Shown in FIG. 13 is a first tilt arrow pointer configuration. Shown in FIG. 14 is a second tilt arrow pointer configuration, and shown in FIG. 15 is a third tilt arrow pointer configuration.

While the graphical magnet interface as shown in FIGS. 9-12 uses cursor control interfaces such as computer mice, touchpads, trackballs, and touchscreens, there are many mobile devices that also employ tilt control. As disclosed in the related applications, a number of unique tilt control input methods can be employed. For example, the user can convey a desired motion on the group-wise pointer 210 by tilting his personal computing device 104 from horizontal to an angle with respect to horizontal direction, the device also tilted in a direction relative to the display interface 200. The greater the tilt angle, the greater the magnitude of the user intent vector. In some embodiments, a graphical icon can be displayed next to the pointer 210 to indicate the direction and optionally the magnitude of the user intent vector. The graphical icon shown in FIGS. 11A-11C is an arrow icon, a direction of the arrow icon indicating the direction of the tilt applied by the user, and an arrow icon size showing the magnitude of the tilt applied by the user. In another example embodiment, the magnet icon 904 can be used instead of the arrow icon.

As shown in FIG. 13, the first arrow icon 1302 has a first direction indicated by a first angle 1304 between the pointer vertical axis 902 and a first arrow axis 1300. The first angle 1304 is approximately 50 degrees. The relatively small size of the first arrow icon 1302 represents a relatively small of weak user intent.

As shown in FIG. 14, the second arrow icon 1402 has a second direction indicated by a second angle 1404 between the pointer vertical axis 902 and a second arrow axis 1400. The second angle 1404 is approximately 160 degrees. The medium size of the second arrow icon 1402 represents a moderate user intent.

As shown in FIG. 15, the third arrow icon 1502 has a third direction indicated by a third angle 1504 between the pointer vertical axis 902 and a third arrow axis 1500. The third angle 1504 is approximately 230 degrees. The relatively large size of the second arrow icon 1402 represents a large or strong user intent.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A decoupled control interface for user interaction with a collaboratively controlled pointer on a computing device, the decoupled control interface comprising:
   a collaborative application running on the computing device and configured to receive user input via a user interface, update a display interface of the computing device, and receive collaboration data over a communication link;
   the collaboratively controlled pointer having a center and displayed on the display interface, whereby a displayed location of the collaboratively controlled pointer is repeatedly updated by the application in response to the received collaboration data;
   a user input icon having a position and orientation on the display interface whereby the position and orientation is repeatedly updated by the application in response to the user input, wherein the user input icon is a magnet icon having a longitudinal axis, wherein the longitudinal axis intersects the center of the collaboratively controlled pointer; and
   a user interface process configured to determine a desired magnitude and a direction of movement of the collaboratively controlled pointer based on the relative positioning of the user input icon with respect to the collaboratively controlled pointer, wherein the collaboration data received over the communication link originates from a collaboration server that repeatedly updates the collaboration data in response to a desired magnitude and direction of motion received from each of a plurality of computing devices.

2. The decoupled control interface of claim 1, wherein the magnitude is determined based on a distance between the magnet icon and the center of the collaboratively controlled pointer.

3. A decoupled control interface for user interaction with a collaboratively controlled pointer on a computing device, the decoupled control interface comprising:
   a collaborative application running on the computing device and configured to receive user input via a user interface, update a display interface of the computing device, and receive collaboration data over a communication link;
   the collaboratively controlled pointer having a center and displayed on the display interface, whereby a displayed location of the collaboratively controlled pointer is repeatedly updated by the application in response to the received collaboration data;
a user input icon having a position and orientation on the display interface whereby the position and orientation is repeatedly updated by the application in response to the user input; and
a user interface process configured to determine a desired magnitude and a direction of movement of the collaboratively controlled pointer based on the relative positioning of the user input icon with respect to the collaboratively controlled pointer, wherein the direction of movement is indicated by an angle between the user input icon and a reference line passing through the center of the collaboratively controlled pointer, wherein the collaboration data received over the communication link originates from a collaboration server that repeatedly updates the collaboration data in response to a desired magnitude and direction of motion received from each of a plurality of computing devices.

* * * * *

UNITED STATES PATENT AND TRADEMARK OFFICE
CERTIFICATE OF CORRECTION

PATENT NO. : 9,940,006 B2
APPLICATION NO. : 14/738768
DATED : April 10, 2018
INVENTOR(S) : Rosenberg Page 1 of 1

It is certified that error appears in the above-identified patent and that said Letters Patent is hereby corrected as shown below:

On the Title Page

Page 2, Column 1, item (60), Related U.S. Application Data, Lines 1-2, delete "Jun. 15, 2004," and insert --Jun. 15, 2014,--.

Signed and Sealed this
Twenty-fourth Day of July, 2018

Andrei Iancu
*Director of the United States Patent and Trademark Office*